(12) United States Patent
Macxis

(10) Patent No.: US 10,735,936 B1
(45) Date of Patent: Aug. 4, 2020

(54) LEVERAGING FIFTH GENERATION (5G) CELLULAR CAPABILITIES FOR TRANSMISSION AND RECEPTION OF EMERGENCY NOTIFICATIONS AND RESPONSES

(71) Applicant: Bank of America Corporation, Charlotte, NC (US)

(72) Inventor: Mardochee Macxis, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/445,668

(22) Filed: Jun. 19, 2019

(51) Int. Cl.
| | |
|---|---|
| *G08B 1/08* | (2006.01) |
| *H04W 4/90* | (2018.01) |
| *G08B 21/10* | (2006.01) |
| *G08B 26/00* | (2006.01) |
| *H04W 68/10* | (2009.01) |
| *G08B 25/00* | (2006.01) |
| *G08B 27/00* | (2006.01) |

(52) U.S. Cl.
CPC ............ *H04W 4/90* (2018.02); *G08B 21/10* (2013.01); *G08B 25/007* (2013.01); *G08B 26/008* (2013.01); *G08B 27/001* (2013.01); *H04W 68/10* (2013.01)

(58) Field of Classification Search
CPC ................................ H04W 4/90; G08B 21/10
USPC .... 340/539.1, 539.22, 539.32, 7.3, 435–438, 340/540, 541
See application file for complete search history.

(56) References Cited

U.S. PATENT DOCUMENTS

| | | | |
|---|---|---|---|
| 9,788,211 B2 | 10/2017 | Zhang | |
| 9,961,624 B1 | 5/2018 | Zait | |
| 10,259,668 B2 | 4/2019 | Yamamoto | |
| 2009/0284348 A1* | 11/2009 | Pfeffer | G08B 25/016 340/7.3 |
| 2011/0071880 A1* | 3/2011 | Spector | H04W 4/90 340/573.1 |
| 2015/0358794 A1* | 12/2015 | Nokhoudian | H04W 4/90 455/404.1 |
| 2017/0064527 A1* | 3/2017 | Bohlander | H04W 4/90 |
| 2019/0387000 A1* | 12/2019 | Zavesky | H04L 41/16 |

* cited by examiner

*Primary Examiner* — Tai T Nguyen
(74) *Attorney, Agent, or Firm* — Banner & Witcoff, Ltd.; Michael A. Springs

(57) ABSTRACT

Aspects of the disclosure relate to transmission of emergency event notifications and reception of responses corresponding to the emergency event notifications. A computing platform may receive emergency event information. The computing device may identify, based on the emergency event information, a first target device. The computing device may transmit, a first notification to the first target device. Thereafter, the computing device may receive, from the first target device, a response corresponding to the first notification. The computing device may identify, based on the first response and the emergency event information, a second target device. Then, the computing device may transmit a second notification to the second target device. The second notification may comprise information that is different from information in the first notification.

20 Claims, 9 Drawing Sheets

LEVERAGING FIFTH GENERATION (5G) CELLULAR CAPABILITIES FOR TRANSMISSION AND RECEPTION OF EMERGENCY NOTIFICATIONS AND RESPONSES

BACKGROUND

Ubiquitous availability of mobile devices, such as smart phones and tablets, that are connected to wireless networks has opened up avenues for faster dissemination of information. In some situations, attempts by a large number of devices to access a wireless network may result in a reduced quality of services to all devices. Maintaining connectivity may prove to be critical when attempting to gather and provide information during natural disasters or man-made emergencies. Consistently providing and updating information to users may result in facilitating a more coordinated response and damage limitation.

Servicing an ever-increasing number of connected devices has been a constant driver for introduction of newer cellular standards and technologies. Various connectivity enhancements introduced by the fifth generation (5G) communication standards and devices are focused on larger data throughput and/or longer ranges.

SUMMARY

Aspects of the disclosure provide effective, efficient, scalable, and convenient technical solution that address and overcome technical problems associated with transmission of emergency event notifications, and providing updated information, in an emergency response system. In particular, one or more aspects of the disclosure relate to utilization of $5^{th}$ generation wireless cellular (5G) technologies, for more robust communication that facilitates coordinated emergency response and/or disaster management.

In accordance with one or more embodiments, a computing platform having at least one processor, a communication interface, and memory may receive, via the communication interface, emergency event information. The emergency event information may comprise a first location information corresponding to an emergency event. The computing platform may identify, based on the emergency event information, a first target device. Then, the computing platform may transmit, via the communication interface and to the first target device, a first notification. The first notification may comprise the first location information corresponding to the emergency event. Thereafter, the computing platform may receive, via the communication interface and from the first target device, a response corresponding to the first notification. The computing device may identify, based on the response and the emergency event information, a second target device. Then the computing device may transmit, via the communication interface and to the second target device, a second notification, wherein the second notification comprises a second location information, wherein the second location information is different from the first location information.

In some embodiments, identifying the first target device comprises identifying a device as the first target device based on one or more of (i) location of the device, (ii) location of the emergency event, (iii) preferences of a user corresponding to the device, (iv) location of the user, (v) emergency event type, and/or (vi) severity of the emergency event.

In some embodiments, identifying the second target device comprises identifying a device as the second target device based on one or more of (i) location of the device, (ii) location of an emergency event, (iii) preferences of a user corresponding to the device, (iv) location of the user, (v) emergency event type, and/or (vi) severity of the emergency event.

In some embodiments, the second target device is same as the first target device.

In some embodiments, the second location information corresponds to a location of a communication device different from the first target device.

In some embodiments, the second target device is different from the first target device.

In some embodiments, the second location information corresponds to a location of the first target device.

In some embodiments, the computing platform may receive, via the communication interface, updated emergency event information, wherein the updated emergency event information comprises updated information corresponding to an emergency event. The computing platform may identify, based on the updated emergency event information, a third target device. Thereafter, the computing platform may transmit, via the communication interface to the third target device, a third notification.

In accordance with one or more embodiments, a communication device comprising at least one processor, a communication interface, and memory may receive, via the communication interface and from a computing platform, a first notification, wherein the first notification comprises a first location information corresponding to an emergency event. Thereafter, the communication device may transmit, via the communication interface and to the computing platform, a response corresponding to the first notification. Then, the communication device may receive, via the communication interface and from the computing platform, a second notification, wherein the second notification comprises a second location information, wherein the second location information is different from the first location information.

In some embodiments, the second location information corresponds to a location of another communication device.

In some embodiments, the communication device may receive, via the communication interface and from the computing platform, a third notification, wherein the third notification comprises an update to the emergency event.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
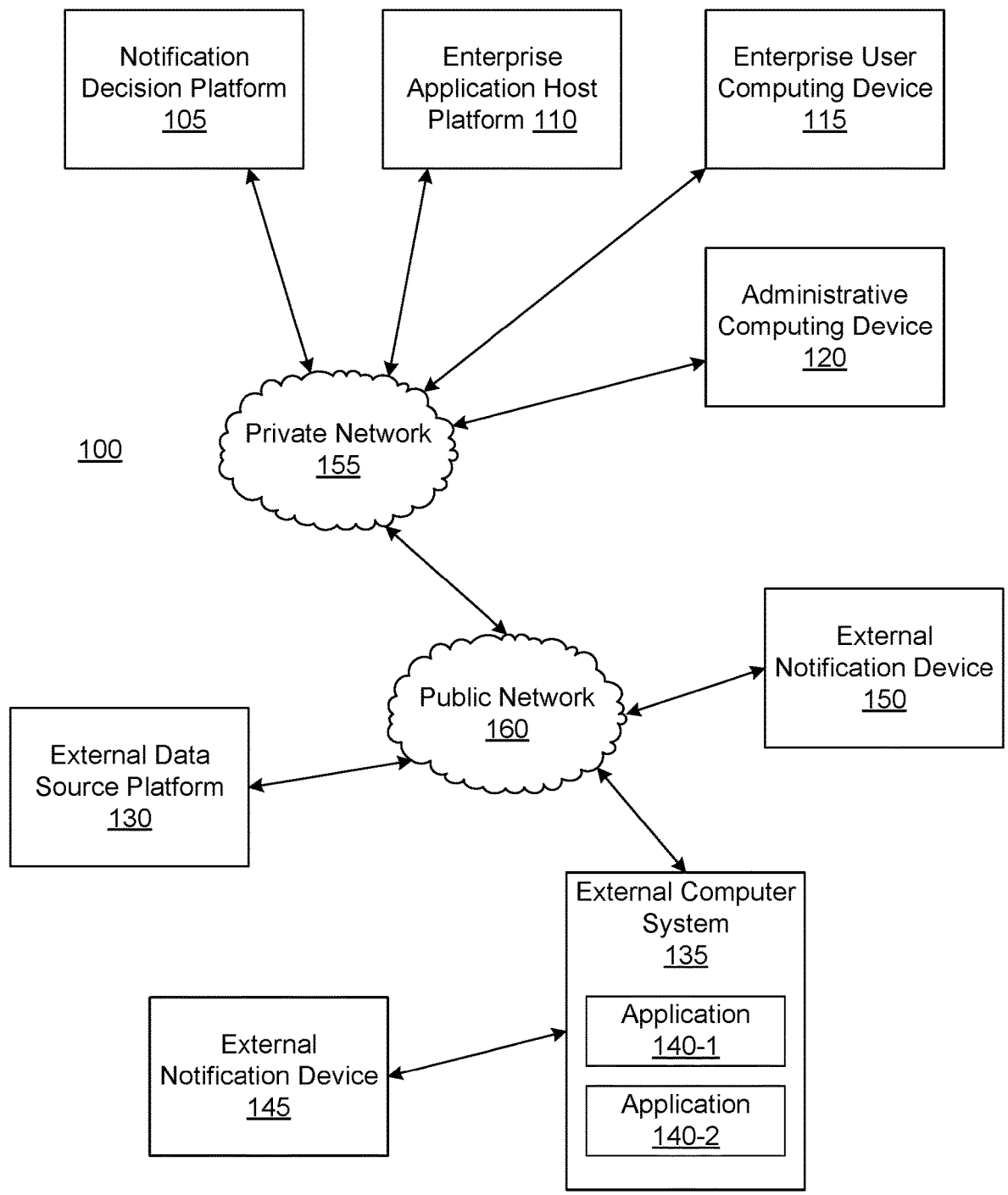
FIGS. 1A and 1B depict an illustrative computing environment for determination of an anticipated or an ongoing emergency event and transmission/reception of notifications and responses, in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for determining emergency event information corresponding to an anticipated or an ongoing emergency event, natural or man-made, and transmitting a notification corresponding to the emergency event information to one or more devices. For example, a transmitting device may determine emergency event information corresponding to an emergency event, categorize the emergency event, and transmit a notification corresponding to the emergency event information to a target device. Some aspects of this disclosure further relate to enabling the target device to respond to the notification. Some aspects of this disclosure further relate to determining updates to the emergency event information and transmitting another notification, corresponding to updated emergency event information, to the target device.

Determination of emergency event information may comprise one or more of determination of an emergency event type, determination of a scale of the emergency event, determination of a location of the emergency event, and the like. Transmission of a notification to the target device may comprise identifying the target device, and transmission of the notification to the identified target device. Identifying a device as the target device may comprise, for example, one or more of determination of an emergency event type, determination of a scale of the emergency event, determination of a location of the device, preferences corresponding to the device, and/or determination of a location of a user, and the like. Transmission of the notification may utilize various encoding and transmission protocols corresponding to wireless or wired transmissions. An alert message corresponding to the notification may be indicated on the target device on a display screen, audio system, and the like. An alert message corresponding to the notification may be indicated in the form of, including but not limited to, electronic mail, notifications in an application of the target user device (e.g., an application corresponding to an enterprise organization operating a notification system), a push notification, an audible notification, a visual notification, or other sensory notification (e.g., vibration). The alert message may be indicated in a device connected to the target device.

A user corresponding to the target device may input a response to the notification. The transmitting device may utilize this response to transmit another notification to the target device. The transmitting device may transmit another notification to the target device to provide updated emergency event information.

Introduction of 5G technologies is expected to significantly improve data throughput of wireless cellular systems. One or more of the data transmission procedures described above may utilize 5G technologies for transmission (e.g., transmission of the notification). The utilization of 5G technologies may ensure secure transmission of notifications to multiple target devices with lower probability of network congestion. Reduced network congestion may ensure a more efficient and well-coordinated response to emergency events.

Figure 1B:
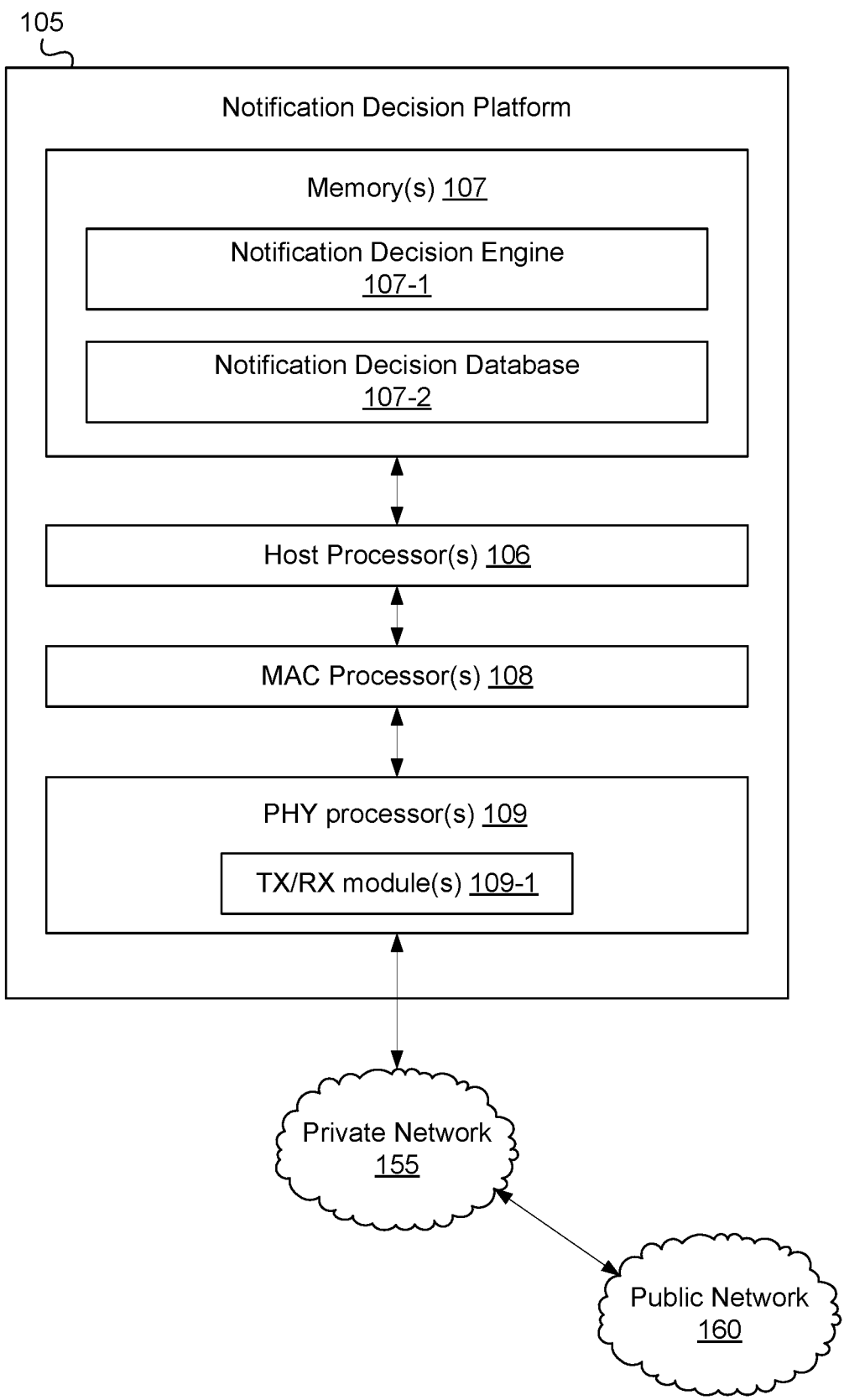

FIGS. 1A and 1B depict an illustrative computing environment for determination of an anticipated or an ongoing emergency event and transmission/reception of notifications and responses in accordance with one or more aspects described herein. Referring to FIG. 1A, a computing environment 100 may comprise one or more computer systems. For example, the computing environment 100 may comprise a notification decision platform 105, an enterprise application host platform 110, an enterprise user computing device 115, an administrative computing device 120, an external data source platform 130, an external computer system 135, an external notification device 145, and an external notification device 150. The one or more devices and systems noted above may be linked over communication networks such as a private network 155 and a public network 160. The communication networks may use wired and/or wireless communication protocols.

A user in a context of the computing environment 100 may, for example, be an associated user (e.g., a client, an employee, an affiliate, or the like.) of an enterprise organization operating the notification decision platform 105. A user in a context of the computing environment 100 may, for example, be an external user who is not associated with the enterprise organization and who may interact with one or more elements in the computing environment 100. Users may operate one or more elements in the computing environment to send messages to and/or receive messages from the notification decision platform 105.

As illustrated in greater detail below, the notification decision platform 105 may comprise one or more computing devices configured to perform one or more of the functions described herein. For example, the notification decision platform 105 may comprise one or more computers (e.g., laptop computers, desktop computers, servers, server blades, or the like).

The enterprise application host platform 110 may comprise one or more computing devices and/or other computer components (e.g., processors, memories, communication interfaces). In addition, and as illustrated in greater detail below, the enterprise application host platform 110 may be configured to host, execute, and/or otherwise provide one or more enterprise applications. For example, the enterprise application host platform 110 may be configured to host, execute, and/or otherwise provide one or more transaction processing programs, loan application processing programs, and/or other programs associated with an enterprise organization, such as a financial institution. In some instances, the enterprise application host platform 110 may be configured to provide various enterprise and/or back-office computing functions for an enterprise organization, such as a financial institution. For example, the enterprise application host platform 110 may comprise various servers and/or databases that store and/or otherwise maintain account information, such as financial account information including account balances, transaction history, account owner information, and/or other information. In addition, the enterprise application host platform 110 may process and/or otherwise execute transactions on specific accounts based on commands and/or other information received from other computer systems comprising the computing environment 100. Additionally, or alternatively, the enterprise application host platform 110 may receive data from the notification decision platform 105, manipulate and/or otherwise process such data, and/or return processed data and/or other data to the notification decision platform 105 and/or to other computer systems in the computing environment 100.

The enterprise user computing device 115 may be a personal computing device (e.g., desktop computer, laptop computer) or mobile computing device (e.g., smartphone, tablet). In addition, the enterprise user computing device 115 may be linked to and/or operated by a specific enterprise user (who may, e.g., be an employee or other affiliate of an enterprise organization operating the notification decision platform 105). The administrative computing device 120 may be a personal computing device (e.g., desktop computer, laptop computer) or mobile computing device (e.g., smartphone, tablet). In addition, the administrative computing device 120 may be linked to and/or operated by an administrative user (who may, e.g., be a network administrator of an enterprise organization operating the notification decision platform 105).

The external data source platform 130 may comprise one or more computing devices and/or other computer components (e.g., processors, memories, communication interfaces, or the like.). The external data source platform 130 may additionally comprise of one or more sensors that may gather and process information corresponding to anticipated or ongoing emergency events, such as meteorological information. The external data source platform 130 may comprise sensors and/or databases operated by and/or linked with the National Weather Service (NWS) or other private organizations including weather radars, satellites, etc. The external data source platform 130 may gather information related to an incoming or ongoing weather event, such as a tornado, flood, snowstorm, etc., which may be relayed across the computing environment 100.

In addition, the external data source platform 130 may be linked to and/or operated by one or more external users who might not be associated with an enterprise organization operating the notification decision platform 110. The external data source platform 130 may also provide information related to emergency events sourced from, for example, emergency notifications from police services, emergency notifications from fire services, nationwide presidential alerts, alerts transmitted via social media, and the like.

The external computer system 135 may be a personal computing device (e.g., desktop computer, laptop computer) or mobile computing device (e.g., smartphone, tablet). The external computer system 135 may be linked to and/or operated by an associated user (who may, e.g., be a client or an affiliate or an employee) of an enterprise organization operating the notification decision platform 105 and who may interact with one or more enterprise resources while using a device located outside of an enterprise firewall, or an external user who might not be associated with the enterprise organization. One or more applications 140, may operate on the external computer system 135 and perform one or more functions corresponding to determination of emergency event information and/or reception of notifications and/or transmission of responses as described in this disclosure. The one or more applications 140 may correspond to an enterprise organization operating the notification decision platform 105. The one or more applications 140 may be for example, software application(s), such as application(s) corresponding to a financial institution, a government or a private enterprise, a health institution, an educational institution, or the like, electronic mail application(s), messaging application(s), and the like. The one or more applications 140 may be software application(s) running on an operating system of the external computer system 135, or may be built into the framework of the operating system itself. The one or more applications 140 may be software application(s) corresponding to an enterprise organization operating the notification decision platform 105. The external computer system 135 may be a personal computing device (e.g., desktop computer, laptop computer, or the like.) or mobile computing device (e.g., smartphone, tablet, or the like.). The external notification device 135 may be a display device such as a television or an audio system such as a car stereo or a smart speaker. The external notification device 135 may also be a personal wearable device, such as a smart watch or a fitness tracker.

The external notification device 145 may be utilized for notification of an emergency event. The external computer system 135 may be communicatively coupled, over wired and/or wireless communication links, to the external notification device 145. The external computer system 135 may be communicatively coupled, for example, over International Institute of Electrical and Electronics Engineers (IEEE) Standard 802.15.1 ("Bluetooth"), IEEE Standard 802.11 ("Wi-Fi"), and/or near-field communication (NFC), or the like, links to the external notification device 145. The external notification device 145 may be a display device such as a television or an audio system such as a car stereo or a smart speaker. The external notification device 145 may also be a personal wearable device, such as a smart watch or a fitness tracker.

The external notification device 150 may be utilized for notification of an emergency event and may be directly linked to public network 160. The external notification device 150 may be a public display device such as a billboard display, a television screen in a public area such as a metro station or an airport, an automatic teller machine (ATM) screen, a vending machine screen, or the like. The external notification device 150 may be a public notification device such as a public speaker system. The external notification device 150 may be, for example, a device linked to an emergency response system such as a system corresponding to 9-1-1 services (or the equivalent), police services, fire services, and/or ambulance services, and the like. The external notification device 150 may be, for example, a device corresponding to an enterprise organization operating the notification decision platform 105. The external notification device 150 may be, for example, similar in functionality to the external notification device 145. The external notification device 150 may be a display device such as a television, or an audio system such as a car stereo or a smart speaker. The external notification device 150 may also be a personal wearable device, such as a smart watch, a fitness tracker, or the like.

The computing environment 100 may also comprise of one or more networks, which may interconnect one or more of the notification decision platform 105, the enterprise application host platform 110, the enterprise user computing device 115, the administrative computing device 120, the external data source platform 130, the external computer system 135, the external notification device 145, and the external notification device 150. For example, the computing environment 100 may comprise a private network 155 (which may, e.g., interconnect the notification decision platform 105, the enterprise application host platform 110, the enterprise user computing device 115, the administrative computing device 120, and/or one or more other systems which may be associated with an enterprise organization, such as a financial institution, a government or a private enterprise, a health institution, an educational institution, or the like) and public network 160 (which may, e.g., interconnect the external data source platform 130, the external computer system 135, and the external notification device 150 with private network 155 and/or one or more other systems, public networks, sub-networks, and/or the like).

In one or more arrangements, the notification decision platform 105, the enterprise application host platform 110, the enterprise user computing device 115, the administrative computing device 120, the external data source platform 130, the external computer system 135, the external notification device 145, the external notification device 150, and/or the other systems in the computing environment 100 may be any type of computing device capable of receiving input via the user interface, and communicating the received input to one or more other computing devices. For example, the notification decision platform 105, the enterprise application host platform 110, the enterprise user computing device 115, the administrative computing device 120, the external data source platform 130, the external computer system 135, and/or the other systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. In one or more arrangements, the external notification device 145, the external notification device 150, and/or other systems included in the computing environment 100 may be any type of display device, audio system, wearable devices (e.g., a smart watch, fitness tracker, etc.). As noted above, and as illustrated in greater detail below, any and/or all of the notification decision platform 105, the enterprise application host platform 110, the enterprise user computing device 115, the administrative computing device 120, the external data source platform 130, the external computer system 135, the external notification device 145, and the external notification device 150, may, in some instances, be special-purpose computing devices configured to perform specific functions.

Referring to FIG. 1B, the notification decision platform 105 may comprise of one or more of host processor(s) 106, memory 107, medium access control (MAC) processor(s) 108, physical layer (PHY) processor(s) 109, transmit/receive (TX/RX) module(s) 109-1, etc. One or more data buses may interconnect host processor(s) 106, memory 107, MAC processor(s) 108, PHY processor(s) 109, and Tx/Rx module(s) 109-1. The notification decision platform 105 may be implemented using one or more integrated circuits (ICs) configured to operate as discussed below. The host processor(s) 106, the MAC processor(s) 108, and the PHY processor(s) 109 may be implemented, at least partially, on a single IC or multiple ICs. Memory 107 may be any memory such as a random access memory (RAM), a read-only memory (ROM), a flash memory, or any other electronically readable memory, etc.

In various examples described below, messages transmitted from and received at devices in the computing environment 100 may be encoded in one or more MAC data units or PHY data units. In various embodiments, the MAC processor(s) 108 and/or the PHY processor(s) 109 of the notification decision platform 105 are configured to generate data units, and process received data units, that conform to any suitable wired and/or wireless communication protocol. For example, the MAC processor(s) 108 may be configured to implement MAC layer functions, and the PHY processor(s) 109 may be configured to implement PHY layer functions corresponding to the communication protocol. The MAC processor(s) 108 may, for example, generate MAC data units (e.g., MAC protocol data units (MPDUs)), and forward the MAC data units to the PHY processor(s) 109. The PHY processor(s) 109 may, for example, generate PHY data units (e.g., PHY protocol data units (PPDUs)) based on the MAC layer data units. The generated PHY data units may be transmitted via the TX/RX module(s) 109-1. Similarly, the PHY processor(s) 109 may receive PHY data units from the TX/RX module(s) 109-1, extract MAC layer data units encapsulated within the PHY data units, and forward the extracted MAC data units to the MAC processor(s). The MAC processor(s) 108 may then process the MAC data units as forwarded by the PHY processor(s) 109.

In an embodiment, one or more processors (e.g., the host processor(s) 106, the MAC processor(s) 108, the PHY processor(s) 109, or the like.) of the notification decision platform 105 are configured to execute machine readable instructions stored in memory 107. Memory 107 may comprise (i) one or more program modules/engines having instructions that when executed by the one or more processors cause the notification decision platform 105 to perform one or more functions described herein and/or (ii) one or more databases that may store and/or otherwise maintain information which may be used by the one or more program modules/engines and/or the one or more processors. In some instances, the one or more program modules/engines and/or databases may be stored by and/or maintained in different memory units of the notification decision platform 105 and/or by different computing devices that may form and/or otherwise make up the notification decision platform 105. For example, memory 107 may have, store, and/or comprise a notification decision engine 107-1, and a notification decision database 107-2. Notification decision engine 107-1 may have instructions that direct and/or cause the notification decision platform 105 to determine an emergency event and transmit one or more notifications to the external computer system 135 and/or the external notification device 145 and/or the external notification device 150, as discussed in greater detail below. Notification decision database 107-2 may store information corresponding to preferences and/or location information related to the external computer system 135 and/or the external notification device 145 and/or the external notification device 150, and may further store information corresponding to emergency events. Information stored in the notification decision database 107-2 may be utilized by host processor(s) 106, MAC processor(s) 108, and PHY processor(s) 109 to determine an emergency event and transmit one or more notifications to the external computer system 135 and/or the external notification device 145 and/or the external notification device 150, as discussed in greater detail below.

One or more of the MAC processor(s) 108, the PHY processor(s) 109, and/or the TX/RX modules(s) 109-1 implement 5G communication standards. The memory 107 may store machine readable instructions that, when executed by the one or more of the MAC processor(s) 108, the PHY processor(s) 109, and/or the TX/RX modules(s) 109-1 enable generation, transmission, reception, and/or processing of one or more data units that conform to the 5G communication standards. One or more of the host processor(s) 106, the MAC processor(s) 108, and the PHY processor(s) 109 may use hardware and/or software that implements the 5G communication standards. For example, the MAC processor(s) 108 may generate MPDUs and the PHY processor(s) 109 may generate PPDUs that conform to the 5G communication standards, which may be then transmitted by the TX/RX module(s) 109-1 over a 5G wireless communication channel.

While FIG. 1A illustrates the notification decision platform 105 as being separate from other elements connected in private network 155, in one or more other arrangements, the notification decision platform 105 may be included in one or more of the enterprise application host platform 110, the enterprise user computing device 115, and the administrative computing device 120. In an example, elements in the notification decision platform (e.g., host processor(s) 105, memory(s) 107, MAC processor(s) 108, PHY processor(s) 109, and TX/RX module(s) 111, one or more program modules and/or stored in memory(s) 107) may share hardware and software elements with and corresponding to one or more of the enterprise application host platform 110, the enterprise user computing device 115, and the administrative computing device 120.

Figure 2A:
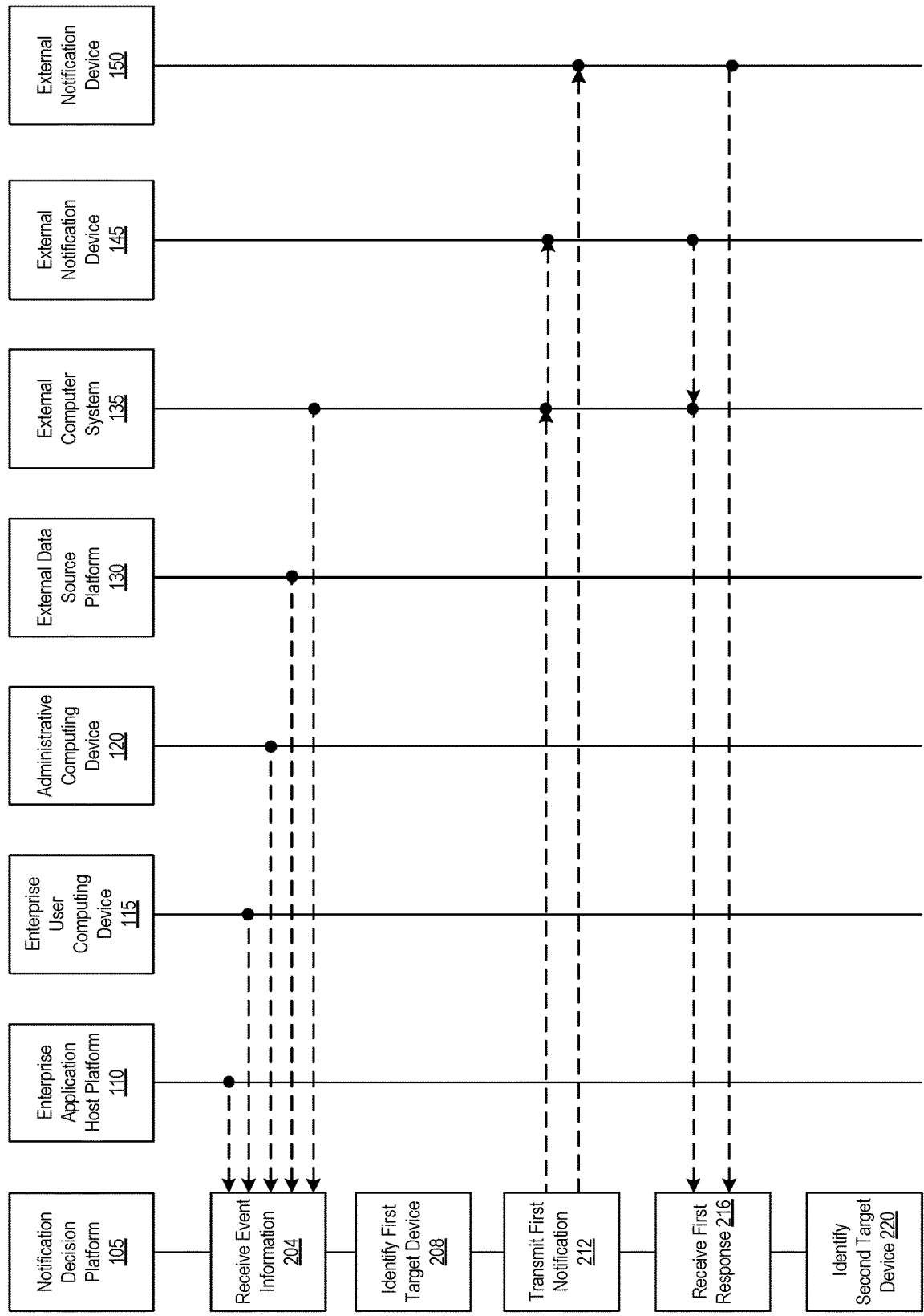
FIGS. 2A and 2B depict an illustrative event sequence for determination of an emergency event, transmitting/reception of notifications, and transmission/reception of responses to the notifications, in accordance with one or more example embodiments.
Figure 2B:
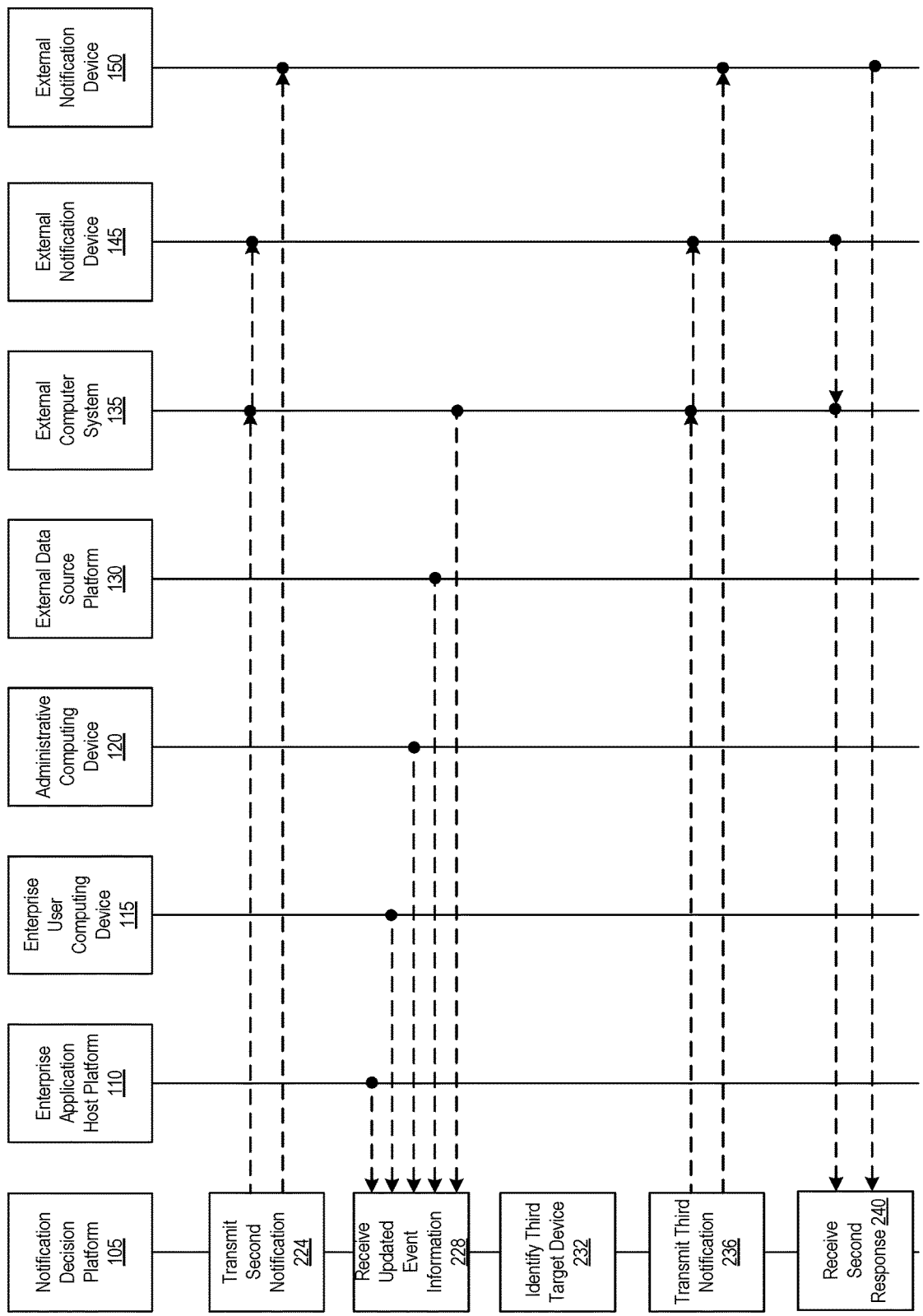

FIGS. 2A and 2B depict an illustrative event sequence for determination of an emergency event, transmitting/reception of notifications, and transmission/reception of responses to the notifications, in accordance with one or more example embodiments. The illustrative event sequence is described with reference to the computing environment 100 merely as an example. In other embodiments, the illustrative event sequence occurs in a computing environment different from the computing environment 100.

Referring to FIG. 2A, at step 204, the notification decision platform 105 may receive emergency event information corresponding to an emergency event from one or more of the enterprise application host platform 110, the enterprise user computing device 115, the administrative computing device 120, the external data source platform 130, the external computer system 135, or the like. The emergency event information may, for example, correspond to information that has been fed into the enterprise user computing device 115, the administrative computing device 120, or external computing system 130 by an employee or other affiliate of an enterprise organization operating the notification decision platform 105. The emergency event information may, for example, correspond to information obtained from the external data source platform 130.

The emergency event information may comprise, for example, location information (e.g., postal address, ZIP code, global navigation satellite system, GNSS, coordinates, and the like.) corresponding to a location of the emergency event. The emergency event information may, for example, comprise an emergency event type (e.g., active severe weather, predicted severe weather, ongoing police activity, active shooter and/or terrorist attack, or the like.) corresponding to the emergency event. The emergency event information may, for example, comprise a severity (e.g., estimated radius of effected area, scale of possible destruction, severe weather magnitude, etc.) corresponding to the emergency event. The emergency event information may, for example, comprise actions that may need to be taken during the emergency event (e.g., stay in current location, move to shelter, or the like.). The emergency event information may, for example, comprise a location of a shelter (e.g., a severe weather shelter) to move into during the emergency event.

In some embodiments, receiving the emergency event information may include receiving at least part of the emergency event information from devices that correspond to an internal enterprise user and located inside of an enterprise firewall. For example, in receiving the emergency event information, the notification decision platform 105 may receive at least part of the emergency event information from the enterprise user computing device 115 or an administrative computing device 120 that corresponds to an internal enterprise user and located inside of an enterprise firewall (which may, e.g., protect and/or otherwise be associated with the notification decision platform 105 and/or the enterprise application host platform 110 and/or the administrative computing device 120).

In some embodiments, receiving the emergency event information may include receiving at least part of the emergency event information from an external data source platform that is associated with an external third-party entity and located outside of an enterprise firewall. For example, in receiving the emergency event information, the notification decision platform 105 may receive at least part of the emergency event information from the external data source platform 130 that may be associated with an external third-party entity and located outside of an enterprise firewall (e.g., the outside of the enterprise firewall that may protect and/or otherwise be associated with the notification decision platform 105 and/or the enterprise application host platform 110).

In some embodiments, receiving the emergency event information may include receiving at least part of the emergency event information from a device that may be associated with an enterprise user but is located outside of an enterprise firewall. For example, in receiving the emergency event information, the notification decision platform 105 may receive at least part of the emergency event information from the external computer system 13) that may be associated with an enterprise user but is located outside of an enterprise firewall (e.g., the outside of the enterprise firewall that may protect and/or otherwise be associated with the notification decision platform 105 and/or the enterprise application host platform 110).

At step 208, the notification decision platform 105 may identify a first target device to which emergency event information is to be transmitted. The first target device may correspond to, for example, a device such as the external computer system 135, or the external notification device 145, or the external notification device 150. The notification decision platform 105 may identify a device as the first target device based on one or more of (i) location of the device, (ii) location of an emergency event, (iii) preferences of a user operating to the device, (iv) location of the user, (v) emergency event type, and/or (vi) severity of the emergency event, or the like.

The notification decision platform 105 may determine locations (e.g., postal address, ZIP code, GNSS coordinates, and the like) corresponding to one or more of the external computer system 135, or the external notification device 145, or the external notification device 150 using location determination services. The external computer system 135, the external notification device 145, or the external notification device 150 may use location determination services to determine a corresponding location and transmit location information to the notification decision platform 105. Location determination services may determine a location corresponding using cell tower triangulation, Wi-Fi triangulation, GNSS systems, or the like. The notification decision platform may store and/or update locations corresponding to one or more of the external computer system 135, or the external notification device 145, or the external notification device 150 in memory 107 (e.g., notification decision database 107-2) and use this information to determine the first target device.

The notification decision platform 105 may identify a device that is located at or within a distance from a location of the emergency event (e.g., as determined at step 204) as the first target device. The distance may be fixed or may be determined based on one or more factors such as (i) emergency event type, (ii) severity of the emergency event, or the like. The notification decision platform 105 may identify the first target device based on a severity (e.g., estimated radius of effected area, scale of possible destruction, severe weather magnitude, and the like) corresponding to the emergency event. A more severe event may result in devices spanning a wider area being identified as first target devices. The notification decision platform may identify a device that is registered to a user generally located in (e.g., a resident of) a geographical location different from the location of the emergency event (e.g., device registered in a geographical location different from the location of the emergency event) as the first target device, if a current location of the user and/or the device is at or within a distance from a location of the emergency event (e.g., as determined at step 204).

The notification decision platform 105 may identify a device that is determined to be in a proximity of a user as the first target device. The notification decision platform 105 may identify, for example, that the device (e.g. the external notification device 150) is in proximity of the user if another device (e.g., the external computer system 135) corresponding to the user establishes a connection (e.g., an NFC connection, an IEEE 802.11 connection, a Bluetooth connection, or the like) with the device. The notification decision platform 105 may identify, for example, that the device (e.g., the external notification device 150) is in proximity of the user if a location of another device (e.g., the external computer system 135) corresponding to the user matches with (e.g., identical to or with a predetermined distance from) a location of the device.

The notification decision platform 105 may identify a device that is determined to be operated by a user as the first target device. The notification decision platform 105 may identify, for example, that the device (e.g., the external notification device 150) is being operated by the user if the user uses credentials corresponding to an enterprise organization (e.g., the enterprise organization operating the notification decision platform 105) at the device and, based on this, may identify the device as the first target device. For example, if the external notification device 150 is an ATM (associated with the enterprise organization), the notification decision platform 105 may determine that the ATM is being operated by the user if the user uses an ATM card corresponding to the enterprise organization (or another credential) to access the ATM, and based on this, may identify the ATM as the first target device.

The notification decision platform 105 may identify a device corresponding to an emergency services (e.g., a 9-1-1 services, or an equivalent, law enforcement, a fire service, an ambulance service, or the like) as the first target device. The notification decision platform 105 may identify a device corresponding to an emergency service as the first target device, if a service area of the emergency service corresponds to a location of the emergency event.

The notification decision platform 105 may identify the first target device based on, for example, preferences of a user. The notification decision platform 105 may identify a device corresponding to the user as the first target device if the user has selected and/or subscribed to an emergency event notification service. The notification decision platform 105 may identify a device corresponding to the user as the first target device if the user has enabled location determination services at the device. The preferences may be known at the notification decision platform 105 and/or may be input or modified using an application (e.g., an application 140-1). Notification decision database 107-2 may store information corresponding to the preferences.

The notification decision platform 105 may use a combination of one or more factors as described above to identify the first target device. The notification decision platform 105 may use, for example, a location of a device in addition to proximity of a user to the device to determine the first target device.

At step 212, the notification decision platform 105 may transmit a first notification to the first target device as identified in step 208. The first notification may be based on the emergency event information as determined in step 204. The emergency event information may include, for example, one or more of a location of the emergency event, an emergency event type, a severity of the emergency event, action to be taken, a location of a shelter, and the like. The first target device may indicate at least a portion of the emergency event information included in the first notification after or in response to receiving the first notification. The first target device may indicate at least a portion of the emergency event information included in the first notification on a device that is connected to the first target device. For example, if the first target device corresponds to the external computer system 135, the first target device may transmit and indicate at least a portion of the emergency event information included in the first notification on the external notification device 145.

One or more aspects of the emergency event information included in the first notification may be automatically determined (for e.g., using a database stored in notification decision database 107-2) based on one or more other aspects of the emergency event information or the first target device. Notification decision database 107-2 may, for example, store locations of shelters across a geographical service area corresponding to notification decision engine 105. Notification decision database 107-2 may be used to determine a location of one or more viable shelter options based on location information corresponding to the emergency event. Notification decision engine 105 may, for example, select a shelter that is at a safe distance away from a location of the emergency event. Notification decision engine 105 may, for example, select a shelter that is closest to a location of the first target device.

In an example, if the first target device is a public device (e.g., billboard display, a television screen in a public area such as a metro station or an airport, a public speaker system or the like), the first notification may only comprise limited information content. In an example, the first notification may only comprise information that directs a user in a proximity of the first target device to check a personal device of the user for additional emergency event information.

The first notification may be used to direct resources or coordinate a response to the emergency event. The first notification may, for example, include steps to be undertaken by an employee or an affiliate of an enterprise organization operating the notification decision platform 105 to assist clients of the enterprise and facilitate a response to the emergency event.

The first notification may, for example, request a response from the first target device. The first notification may, for example, request a confirmation of a receipt of the first notification. The first notification may, for example, request an indication of whether an whether a user operating the first target device seeks additional information corresponding to the emergency event. The first notification may, for example, request an indication of whether a user operating the first target device requires assistance during the emergency event. The first notification may, for example, request an indication of whether a user operating the first target device is available to assist during the emergency event.

A response may be generated at the first target device based on input of a user corresponding to the first target device. An input may be provided by the user in a form of a touch input on a corresponding touch sensitive display screen of the first target device. An input may be provided by the user in the form of a vocal response at the first target device. The input may be provided using any other form of user interface at the first target device or any other device connected to the first target device.

At step 216, the notification decision platform 105 may receive a first response from the first target device. The first response is, for example, a response corresponding to an input as provided at the first target device, as requested in the first notification. If the first target device corresponds to the external notification device 145, the first response may correspond to, for example, an input as provided at the external notification device 145 that is transmitted to the notification decision platform 105 via the external computer system 135.

The first response may be, for example, a confirmation of a receipt of the first notification at the first target device. The first response may, for example, include a request for more information corresponding to the emergency event. The first response may, for example, include information corresponding to whether assistance is required by a user operating the first target device (that received the first notification) during the emergency event. The first response may, for example, include information corresponding to whether a user operating the first target device is available to assist during the emergency event.

The notification decision platform 105 may repeat one or more of step 204, step 208, step 212, and step 216. The notification decision platform 105 may, for example, detect at least one new or alternative first target device based on one or more factors noted above with reference to step 208 and transmit a corresponding first notification to the at least one new or alternative first target device. The at least one new first target device may be, for example, a device that has just moved into a proximity of the location corresponding to the emergency event. The notification decision platform 105 may, for example, repeat step 212, i.e., retransmit the first notification to the first target device, if the notification decision platform 105 does not receive the first response (e.g., a confirmation of a receipt) to a previously transmitted first notification to the first target device.

At step 220, the notification decision platform 105 may identify a second target device to which a second notification is to be transmitted. In an example, the second target device corresponds to a device such as the external computer system 135, or the external notification device 145, or the external notification device 150. The notification decision platform 105 may identify a device as the second target device based on one or more of (i) location of the device, (ii) location of an emergency event, (iii) preferences of a user operating the device, (iv) location of the user, (v) emergency event type, (vi) severity of the emergency event, and/or (vii) a response received to a previous notification (for e.g., the first response as received at step 216), or the like. One or more of techniques described above with reference to step 208 may be used to determine the second target device. The second target device, for example, may be same as the first target device, as determined in step 208, and from which the first response was received at step 216.

The second target device, for example, may be different from the first target device. The notification decision platform 105 may identify another device as the second target device, if a first response from the first target device indicates that assistance is required by a user operating the first target device during the emergency event. The another device may be identified as the second target device based on one or more of (i) location of the another device, and (ii) proximity of the another device to the first target device, (iii) proximity of a user operating the another device to the user operating the first target device, and the like. The notification decision platform 105 may identify the another device as the second target device if a response, from the another device, to a first notification indicates that a user operating the another device is available to assist during the emergency event.

The notification decision platform 105 may identify a personal device corresponding to a user as the second target device if the notification decision platform 105 identifies a public device as the first target device. In an example, the second target device may be the personal device corresponding to the user if the first notification displays information directing the user to check the personal device of the user for additional notification information. The second target device, for example, may be used to indicate more detailed emergency event information than information indicated on the first target device.

The second target device, for example, may be a device that is operated by an emergency service. The second target device may be a device that is operated by an emergency service that corresponds to a location of the emergency event. The location of the emergency event may, for example, be in a service area of the emergency service operating the second target device. The notification decision platform 105 may identify the device operated by the emergency service as the second target device if a response, from another device, to a first notification indicates that a user operating the another device requires assistance during the emergency event.

At step 224, the notification decision platform 105 may transmit a second notification to the second target device. The second notification may be, for example, responsive to the first response as received in step 216. The second notification may, for example, include emergency event information. The emergency event information may include, for example, one or more of location of the emergency event, emergency event type, severity, action to be taken, a location of a shelter, a location of another device, and the like. The second target device may indicate at least a portion of the emergency event information included in the second notification after or in response to receiving the second notification. The second target device may indicate at least a portion of the emergency event information included in the second notification on a device that is connected to the second target device. For example, if the second target device corresponds to the external computer system 135, the second target device may transmit and indicate at least a portion of the emergency event information included in the second notification on the external notification device 145.

The second target device, for example, may be identical or substantially similar to the first target device. The second target device may be same as the first target device. The second notification may include, in one such example, a location of a shelter if the first response from the first target device includes information indicating that a user operating the first target device requires assistance. The second notification may include, in another such example, a location where assistance is required if the first response from the first target device includes information indicating that a user operating the first target device is available to assist during the emergency event.

The second target device, for example, may be different from the first target device. The second notification may include, in one such example, a location of the first target device, if the first response from the first target device includes information indicating that a user operating the first target device requires assistance.

The second target device may be, for example, a device that is operated by an emergency service. The second notification may be, for example, a notification that requests assistance from the emergency service. In an example, a device operated by emergency services that correspond to a location of the emergency event (e.g., as determined at step 204) may be identified as the second target device to which the second notification is to be transmitted. The second notification transmitted to the second target device corresponding to the emergency service may include, for example, a location information (e.g., postal address, ZIP code, GNSS coordinates, or the like) corresponding to the emergency event. The second notification may be transmitted to the second target device corresponding to the emergency service if the first response, at step 216, includes information indicating that assistance is required by a user operating the first target device and further includes a location of the first target device.

The notification decision platform 105 may, for example, repeat one or both of step 220 and step 224. The notification decision platform 105 may, for example, detect at least one new or alternative second target device based on one or more factors noted above with reference to step 220 and transmit a corresponding second notification to the at least one new or alternative second target device. The at least one new second target device may be, for example, a device that has just moved into a proximity of the location corresponding to the emergency event. The notification decision platform 105 may, for example, repeat step 224, i.e., retransmit the second notification to the second target device.

At step 228, the notification decision platform 105 may receive updated emergency event information. The notification decision platform may receive information from one or more of the enterprise application host platform 110, the enterprise user computing device 115, the administrative computing device 120, the external data source platform 130, and the external computer system 135 and, based on the received information determine that updated emergency event information corresponding to the emergency event is now available. The updated emergency event information may, for example, correspond to updated information that has been fed into the enterprise user computing device 115, the administrative computing device 120, or external computing system 130 by an employee or other affiliate of an enterprise organization operating the notification decision platform 105. The updated emergency event information may, for example, correspond to information obtained from the external data source platform 130.

The updated emergency event information may include, for example, updated location information (e.g., postal address, ZIP code, GNSS coordinates, or the like) corresponding to the emergency event. The emergency event information may, for example, include an updated emergency event type (e.g., active severe weather, predicted severe weather, ongoing police activity, active shooter and/ or terrorist attack, and the like) corresponding to the emergency event. The updated emergency event information may, for example, include an updated severity (e.g., estimated radius of effected area, scale of possible destruction, severe weather magnitude, etc.) corresponding to the emergency event. The updated emergency event information may include new actions that may need to be taken during the emergency event (e.g., stay in current location, move to another shelter, or the like). The updated emergency event information may, for example, include a location of a shelter (e.g., a severe weather shelter) to move into during the emergency event. The updated emergency event information may, for example, include a new location of a shelter to move into during the emergency event. The updated emergency event information may, for example, include information that specifies that an alert corresponding to the emergency event (e.g., as transmitted in a first notification and/or a second notification) is now withdrawn.

At step 232, the notification decision platform 105 may identify a third target device (e.g., user devices and/or public devices) to which updated emergency event information, as determined at step 224, is to be transmitted. The third target device, for example, may correspond to a device such as the external computer system 135, or the external notification device 145, or the external notification device 150. The notification decision platform 105 may identify a device as the third target device based on one or more of (i) location of the device, (ii) location of an emergency event, (iii) preferences of a user operating the device, (iv) location of the user, (v) emergency event type, (vi) severity of the emergency event, and/or (vii) a response received to a previous notification (for e.g., the first response as received at step 216), or the like. The third target device, for example, may be identical or substantially similar to the first target device as determined in step 208 and/or the second target device as determined at step 220. The third target device may be same as the first target device as determined in step 208 and/or the second target device as determined at step 220.

At step 236, the notification decision platform 105 may transmit a third notification to the third target device. The third notification may be based on updated emergency event information as determined in step 224. The third notification may include one or more of (i) updated location information, (ii) updated emergency event type, (iii) updated severity, (iv) updated actions, and (v) updated location of a shelter, or the like. The updated emergency event information may, for example, include information that specifies that an alert corresponding to the emergency event (e.g., as transmitted in the first notification and/or the second notification) is now withdrawn. The third target device may indicate at least a portion of the updated emergency event information included in the third notification after or in response to receiving the third notification. The third target device may indicate at least a portion of the updated emergency event information included in the third notification on a device that is connected to the third target device. For example, if the third target device corresponds to the external computer system 135, the third target device may transmit and indicate at least a portion of the updated emergency event information included in the third notification on the external notification device 145.

The third notification may, for example, request a response from the third target device. The third notification may, for example, request a confirmation of a receipt of the third notification. The third notification may, for example, request an indication of whether an whether a user operating the third target device seeks additional information corresponding to the emergency event. The third notification may, for example, request an indication of whether a user operating the third target device requires assistance during the emergency event. The third notification may, for example, request an indication of whether a user operating the third target device is available to assist during the emergency event.

A response may be generated at the third target device based on input of a user operating the third target device. An input may be provided by the user in a form of a touch input on a corresponding touch sensitive display screen of the third target device. An input may be provided by the user in the form of a vocal response at the third target device. The input may be provided using any other form of user interface at the third target device or any other device connected to the third target device.

At step 240, the notification decision platform 105 receives a second response from the third target device. The notification decision platform 105 receives, for example, the second response from the third target device (e.g., the external computer system 135, and/or the external notification device 145, and/or the external notification device 150) to which the third notification was transmitted at step 236. The second response is, for example, a response corresponding to an input as provided at the third target device, as described above. The second response corresponds to, for example, an input as provided at the external notification device 145 that has been forwarded to the external computer system 135 which then transmits the second response to the notification decision platform 105.

The second response may be, for example, a confirmation of a receipt of the third notification. The second response may, for example, include a request for more information corresponding to the emergency event. The second response may, for example, include information corresponding to whether assistance is required by a user operating the third target device during the emergency event. The second response may, for example, include information corresponding to whether a user operating the third target device is available to assist during the emergency event.

The notification decision platform 105 may repeat one or more of step 224, step 228, step 232, step 236, and step 240. The notification decision platform 105 may, for example, detect at least one new or alternative third target device based on one or more factors noted above with reference to step 208 and transmit a corresponding third notification to the at least one new or alternative third target device. The at least one new third target device may be, for example, a device that has just moved into a proximity of the location corresponding to the emergency event. The notification decision platform 105 may, for example, repeat step 236, i.e., retransmit the third notification to the third target device, if the notification decision platform 105 does not receive a second response (e.g., a confirmation of a receipt) to a previously transmitted third notification to the third target device.

One or more of the first notification, the second notification, and the third notification may be used to direct resources or coordinate a response to the emergency event, based on the event information and/or the updated event information. One or more of the first notification, the second notification, or the third notification may, for example, include steps to be undertaken by an employee or an associate of an enterprise organization operating the notification decision platform 105 to assist clients of the enterprise and facilitate a response to the emergency event based on the event information and/or the updated emergency event information.

Emergency event information and/or updated emergency event information included in one or more of the first notification, the second notification, and the third notification may be indicated on a target device (e.g., the first target device, the second target device, or the third target device) by overriding current usage of the target device. The emergency event information and/or updated emergency event information may, for example, be indicated on the target device by ceasing any indication of other content not related to emergency event information and/or updated emergency event information.

One or more of the first notification, the second notification, the third notification, the first response, the second response, and/or other messages in the computing environment 100, and/or as described in the illustrative event sequence of FIGS. 2A and 2B may be transmitted and received using the 5G communication standards over wireless networks. One or more of the notification decision platform 105, the enterprise application host platform 110, the enterprise user computing device 115, the administrative computing device 120, the external data source platform 130, the external computer system 135, the external notification device 145, and the external notification device 150 may use hardware and software that may implement the 5G communication standards. With reference to the notification decision platform 105, for example, the MAC processor(s) 108 may generate MPDUs (corresponding to one or more messages as described in the illustrative event sequence of FIGS. 2A and 2B) using the 5G communication standards, and the PHY processor(s) 109 may generate PPDUs (corresponding to one or more messages as described in the illustrative event sequence of FIGS. 2A and 2B) using the 5G communication standards, which may be then transmitted by the TX/RX module(s) 109-1 over a 5G wireless communication channel.

5G standards allow a higher throughput than prior wireless cellular technologies that use $4^{th}$ generation (4G) standards, $3^{rd}$ generation (3G) standards, and the like. A higher throughput may allow a larger number of wireless devices (e.g., one or more of the external computer system 135, the external data source platform 130, the external notification device 145, the external notification device 150, etc.) to maintain communication over a wireless network. During emergency events, a larger number of wireless devices may attempt communication over the wireless network. Transmission of one or messages (e.g., one or more of the first notification, the second notification, the third notification, the first response, and/or the second response) using 5G communication standards may result in lower probability of network congestion for better emergency response and/or disaster management.

Some embodiments of 5G communication standards may use a lower frequency transmission channel. A lower frequency channel may result in longer ranges and better penetration through objects. Transmission of one or messages (e.g., one or more of the first notification, the second notification, the third notification, the first response, and/or the second response) using 5G communication standards may result in a broader coverage area and robust signal quality. This may lead to better emergency response and/or disaster management.

One or more of the first notification, the second notification, and the third notification may be, for example, in a form of a push notification, an email message, a short messaging service (SMS) message, a multimedia messaging service (MMS) message, a message associated with the one or more of applications 140 (for e.g., a message displayed in the application 140-1), and/or other visual alert(s) as indicated on a target device or a device connected to the target device. The first notification may be, for example, an audio message as played on the target device or a speaker system connected to the target device. The first notification may be, for example, other sensory notification (e.g., a vibratory alert) on the target device or another device (e.g., a smart watch, a fitness tracker, etc.) connected to the target device.

Figure 3A:
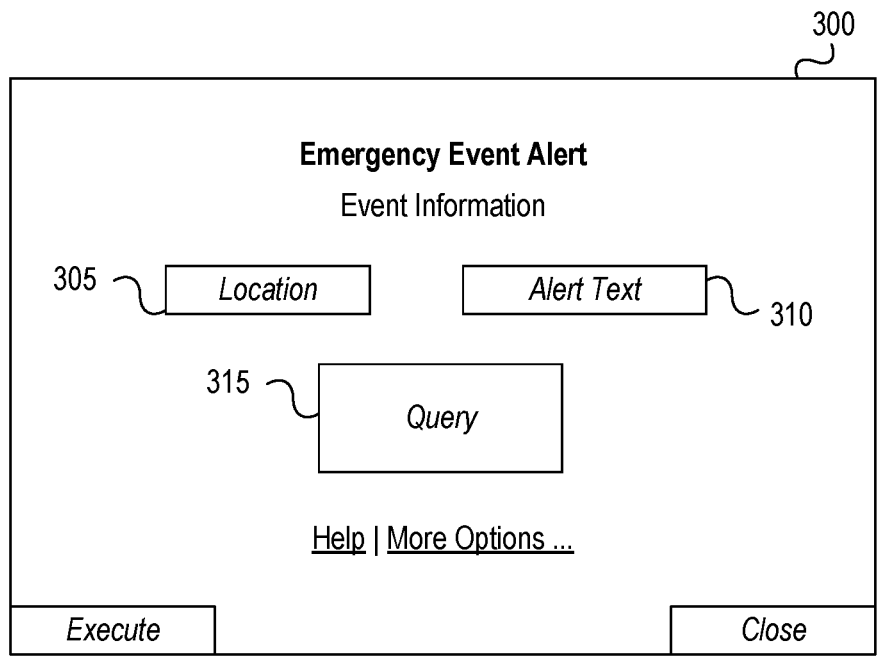
FIG. 3A depicts an example graphical user interface corresponding to determination of an anticipated or an ongoing emergency event and transmission of notifications, in accordance with one or more example embodiments.

FIG. 3A shows an example graphical user interface 300 corresponding to determination of an anticipated or an ongoing emergency event and transmission of notifications in accordance with one or more example embodiments. In an example, the graphical user interface is presented at the administrative computing device 120 or the enterprise user computing device 115. The graphical user interface 300 may also be presented at the external computing system 135. The graphical user interface 300 may be used to provide emergency event information to the notification decision platform 105. The emergency event information may be included in the first notification, and/or the second notification, and/or the third notification as transmitted by the notification decision platform 105.

An employee or an affiliate of an enterprise organization operating the notification decision platform 105 may input a location 305 of an emergency event (e.g., GNSS coordinates, a postal address, a ZIP code, etc.) and an alert text 310 to be displayed at a target device (e.g., the external computer system 135, and/or the external notification device 145, and/or the external notification device 150, or the like) that receives a notification from the notification decision platform 105. The administrative computing device 120 or the enterprise user computing device 115 may further use one or more other sources, as described with reference to step 204 of FIG. 2A, to obtain emergency event information.

The graphical user interface 300 may also be used to provide a query 315 to request a response at a target device. The query 315 may include, for example, a request for a response to confirm a receipt of a notification corresponding to the emergency event. The query 315 may include, for example, a request for a response if assistance is required by a user operating the target device during the emergency event. The query 315 may include, for example, a request for a response if a user operating the target device is available to assist during the emergency event.

Figure 3B:
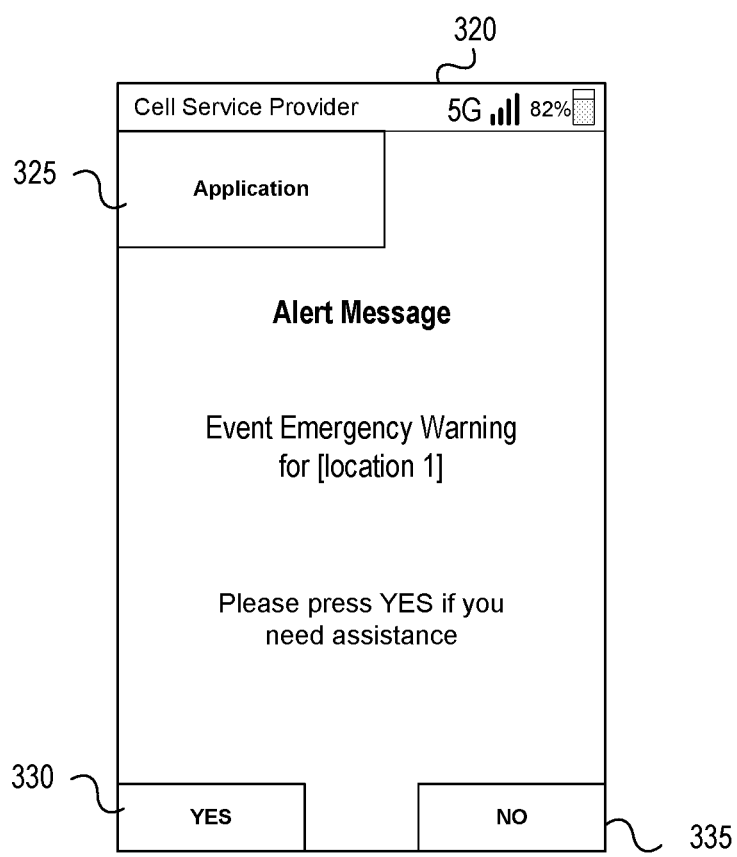
FIGS. 3B-3E depict example graphical user interfaces corresponding to reception of a notification and transmission of a response to the notification, in accordance with one or more example embodiments.

FIG. 3B shows an example graphical user interface 320 corresponding to reception of a notification and transmission of a response to the notification, in accordance with one or more example embodiments. For example, the graphical user interface 320 is presented at a target device (e.g., the external computer system 135, and/or the external notification device 145, and/or the external notification device 150, or the like) that receives a notification (e.g., the first notification or the second notification or the third notification) from the notification decision platform 105. The graphical user interface 320 may be presented at the target device, for example, when the target device receives the notification as transmitted by the notification decision platform 105. The target device may be identified by the notification decision platform 105 as described with reference to step 208 of FIG. 2A. The target device may, for example, correspond to a user who may interact with one or more elements in the computing environment 100. The graphical user interface 320 may be presented at a cellular phone, for example, that is connected to a 5G network.

The graphical user interface 320 may correspond to an application 325 (e.g., a software application, such as the application 140-1). The graphical user interface 320 may display an alert message corresponding to the emergency event and may display location information corresponding to the emergency event. The graphical user interface 320 may display a location of the emergency event (e.g., GNSS coordinates, postal address(es), ZIP code(s), or the like) and an alert text. The graphical user interface 340 may display other information, for example, as determined at step 204 of FIG. 2A and/or step 228 of FIG. 2B. The graphical user interface may display a query, for example, seeking a response at the target device. Response options corresponding to the query may include, for example, a response option 330 specifying that assistance is required by a user operating the target device during the emergency event, and a response option 335 specifying that assistance is not required by the user operating the target device during the emergency event. The graphical user interface may also include an option to input an address (e.g., a ZIP code, a postal address, and the like) where assistance is required by the user. A response by the user operating the target device may be transmitted to the notification decision platform 105 as described in step 216 with reference to FIG. 2A.

Figure 3C:
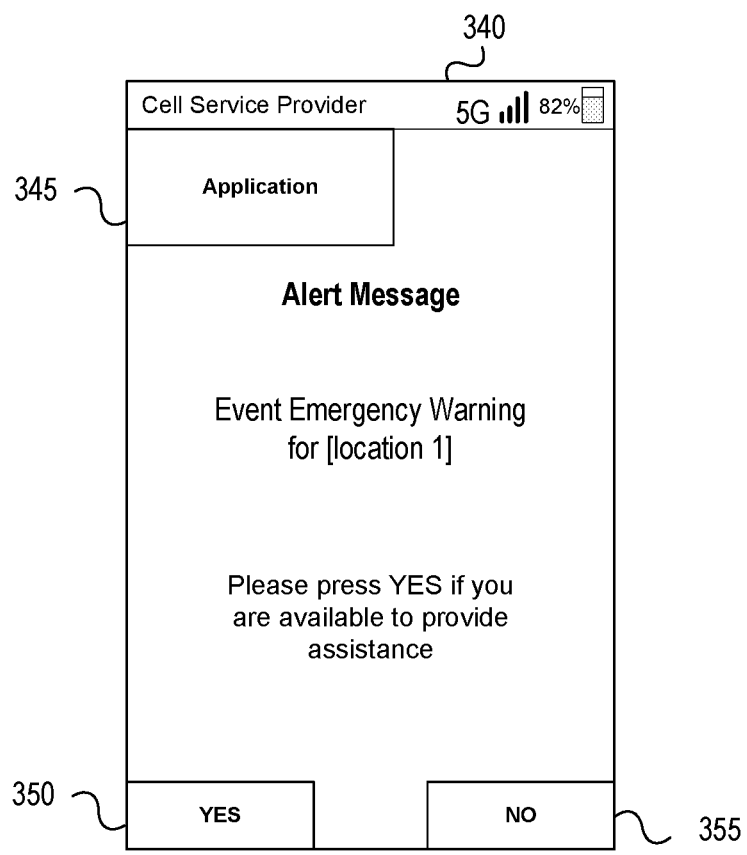

FIG. 3C shows a graphical user interface 340 corresponding to reception of a notification and transmission of a response to the notification, in accordance with one or more example embodiments. For example, the graphical user interface 340 is presented at a target device (e.g., the external computer system 135, and/or the external notification device 145, and/or the external notification device 150, or the like) that receives a notification (e.g., the first notification or the second notification or the third notification) from the notification decision platform 105. The graphical user interface 340 may be presented at the target device, for example, when the target device responds with a message indicating "NO" (e.g., that was input by a user operating the target device using the input option 335) to the alert message in the graphical user interface 320. The graphical user interface 340 may be presented at the target device, for example, when the target device receives the notification as transmitted by the notification decision platform 105. The target device may be identified by the notification decision platform 105 as described with reference to step 208 of FIG. 2A. The graphical user interface 340 may be presented at a cellular phone, for example, that is connected to a 5G network.

The graphical user interface 340 may correspond to an application 345 (e.g., a software application, such as the application 140-1). The graphical user interface 340 may display an alert message corresponding to an emergency event information and may display location information corresponding to the emergency event. The graphical user interface 340 may display a location of the emergency event (e.g., GNSS coordinate, postal address(es), ZIP code(s), and the like) and an alert text. The graphical user interface 340 may display other information, for example, as determined at step 204 of FIG. 2A and/or step 228 of FIG. 2B. The graphical user interface may display a query, for example, seeking a response at the target device. Response options corresponding to the query may include, for example, a response option 350 specifying that a user operating the target device is available to aid during the emergency event, and a response option 350 specifying that the user operating the target device is not available to aid during the emergency event. A response by a user operating the target device may be transmitted to the notification decision platform 105 as described in step 216 with reference to FIG. 2A.

Figure 3D:
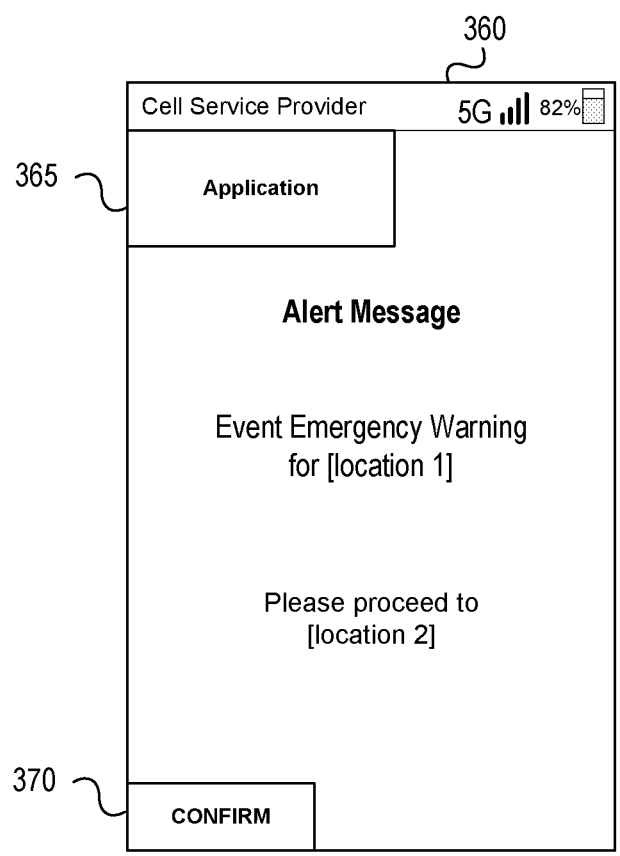

FIG. 3D shows a graphical user interface 360 corresponding to reception of a notification and transmission of a response to the notification, in accordance with one or more example embodiments. For example, the graphical user interface 360 is presented at a target device (e.g., the external computer system 135, and/or the external notification device 145, and/or the external notification device 150, etc.) that receives a notification (e.g., the first notification or the second notification or the third notification) from the notification decision platform 105. The graphical user interface 360 may be presented at the target device, for example, when the target device receives the notification as transmitted by the notification decision platform 105. The graphical user interface 360 may be presented at a cellular phone, for example, that is connected to a 5G network.

The graphical user interface 360 may be presented at a target device, for example, when the target device responds with a message indicating "YES" (e.g., that was input by a user operating the target device using the input option 330) to the alert message in the graphical user interface 320. The graphical user interface 360 may present a location of a shelter (e.g., "location 2") that the user operating the target device may proceed to for the duration of the emergency event. The graphical user interface 360 may display other information, for example, as determined at step 204 of FIG. 2A and/or step 216 FIG. 2B.

The graphical user interface 360 may be presented at a target device, for example, when the target device responds with a message indicating "YES" (e.g., that was input by a user operating the target device using the input option 350) to the alert message in the graphical user interface 340. The graphical user interface 360 may present a location (e.g., "location 2") that a user operating the target device may proceed to in order to provide assistance during the emergency event. The target device may be identified by the notification decision platform 105 as described with reference to step 220 of FIG. 2A. The location may correspond to a location of another user who has specified (e.g., using the graphical user interface 320) that assistance is required by the another user during the emergency event. The graphical user interface 360 may display other information, for example, as determined at step 204 of FIG. 2A and/or step 216 FIG. 2B.

Figure 3E:
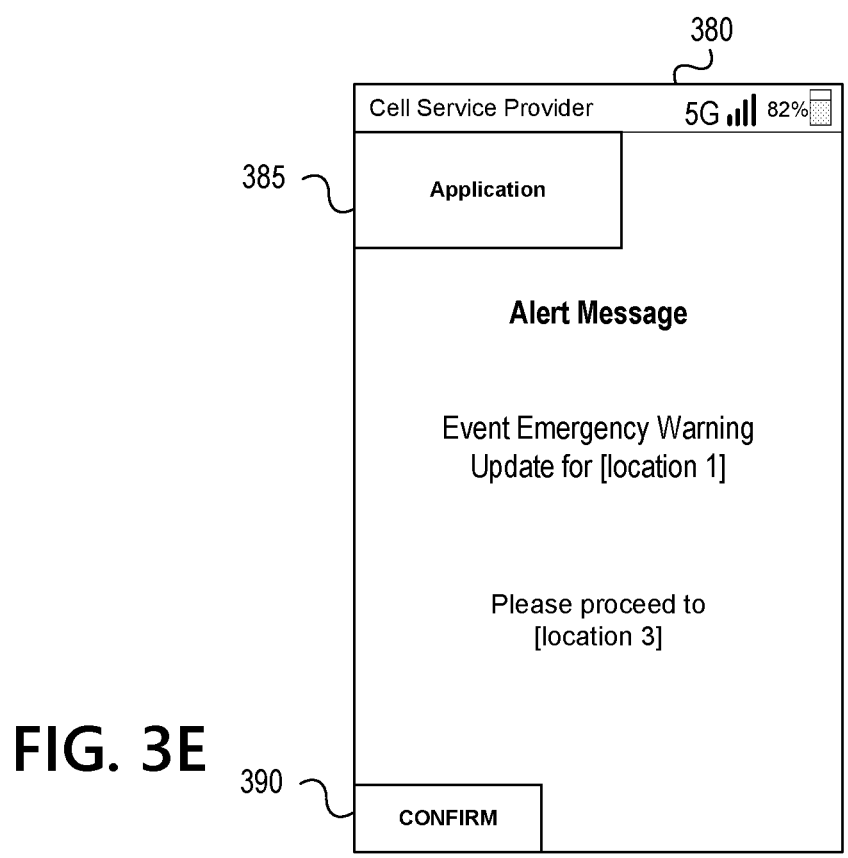

FIG. 3E shows a graphical user interface 380 corresponding to reception of a notification and transmission of a response to the notification, in accordance with one or more example embodiments. For example, the graphical user interface 380 is presented at a target device (e.g., the external computer system 135, and/or the external notification device 145, and/or the external notification device 150, or the like) that receives a notification (e.g., the first notification or the second notification or the third notification) from the notification decision platform 105. The graphical user interface 320 may be presented at the target device, for example, when the target device receives the notification as transmitted by the notification decision platform 105. The notification as transmitted by the notification decision platform may include updated emergency event information as determined with reference to step 228. The target device may be identified by the notification decision platform 105 as described with reference to step 232 of FIG. 2A. The graphical user interface 320 may be presented at a cellular phone, for example, that is connected to a 5G network.

The graphical user interface 380 may correspond to an application 385 (e.g., a software application, such as the application 140-1) etc. The graphical user interface 380 may display an alert message corresponding to the emergency event and may display updated location information corresponding to the emergency event. The graphical user interface 380 may display other information, for example, as determined at step 204 of FIG. 2A and/or step 228 of FIG. 2B. The graphical user interface 380 may display an alert message corresponding to the emergency event and information that specifies that an alert corresponding to the emergency event (e.g., the alert message as displayed in the graphical user interface 320 and/or the alert message as displayed in the graphical user interface 340) is now withdrawn. A response option may include, for example, a response option 390 confirming a receipt of the notification. A response by a user operating the target device may be transmitted to the notification decision platform 105 as described in step 240 with reference to FIG. 2B.

In certain situations, corresponding to emergencies, a breakdown in communication infrastructure may occur. Cell phone services, for example, may be disrupted leading to possible loss of communication between a cell phone service base station and wireless communication devices. The wireless communication devices (for e.g., one or more of the external computer system 135 and/or the external notification device 145, and/or the external notification device 150) may be unable to receive/transmit one or more notifications and/or response messages described herein from/to the notification decision platform 105. In at least some such situations, the wireless communication devices may utilize a communication protocol that does not rely on communication with the cell phone service base station to propagate one or more signals that include notifications and/or response messages described herein. A first communication device may attempt a connection with a second communication device using, for example, an IEEE 802.11a/b/g/n/ac/ax communication protocol, a Bluetooth communication protocol, or any other communication protocol that does not rely on the cell phone service base station, for example, in response to determining a loss of connectivity to the cell phone service base station. An application (e.g., the application 140-1) operating in the first communication device and in the second communication device may facilitate this connectivity. In an example, the application 140-1 may seek authorization by a user operating the first communication device/second communication device to establish this connectivity. In an example, the application 140 may seek authorization in response to a determination that a connection between the first communication device/second communication device to the cell phone service base station has been lost. Based on a received authorization (e.g., through a user response to the authorization request), the first communication device/second communication device may establish connectivity and transmit/receive one or more of the first notification, the second notification, the third notification, the first response, the second response, etc. to/from each other using the established connectivity. In an example, the external computer system 135 ("first communication device") may receive the first notification from the notification decision platform 105 and transmit at least a portion of information included in the first notification to another external computer system ("second communication device") when the one or both of the first communication device and the second communication device determine a loss of connectivity to a cell phone service base station.

Figure 4:
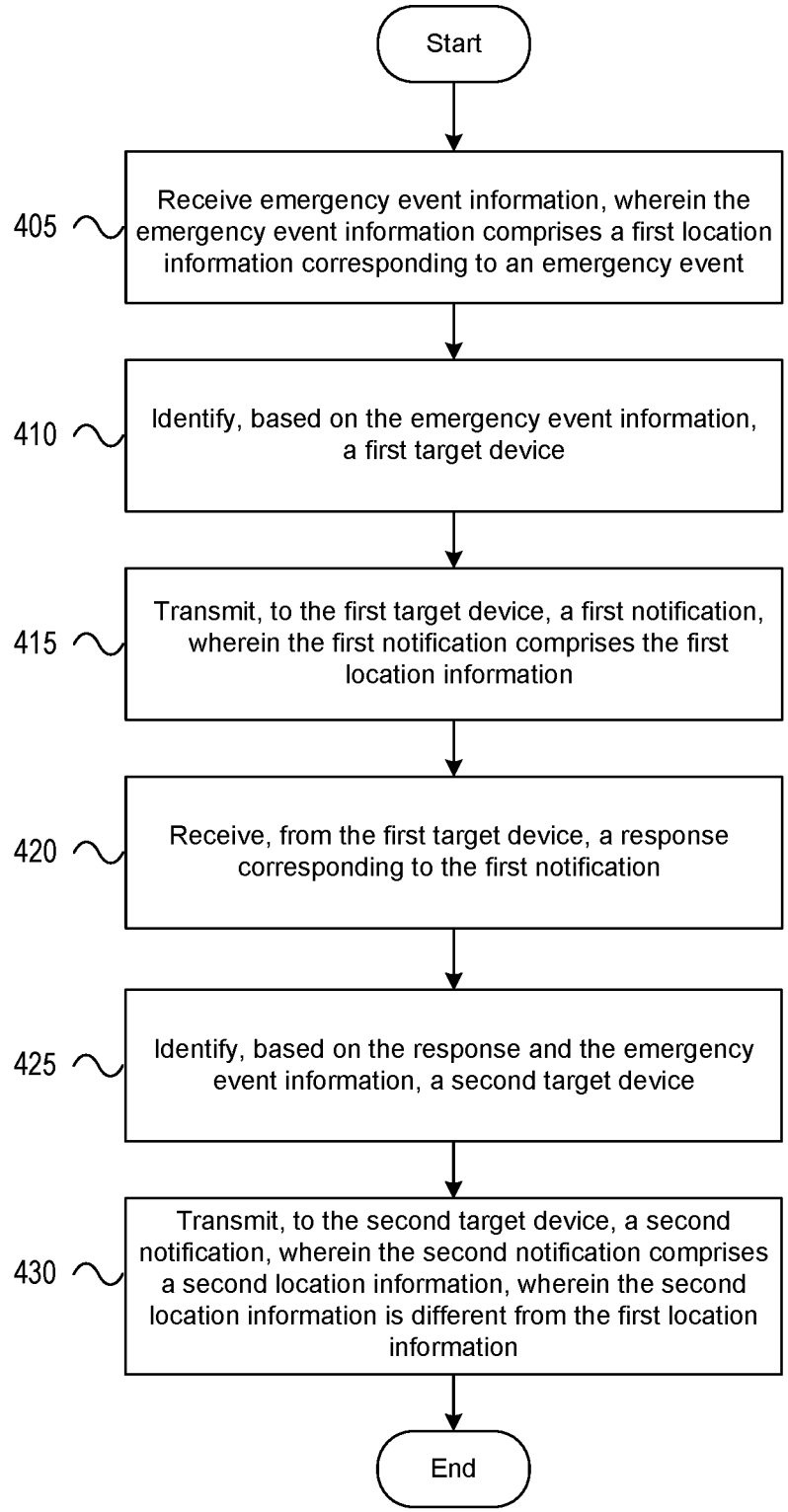
FIG. 4 depicts an illustrative method for transmission of notifications, and reception of responses, corresponding to an emergency event, in accordance with one or more example embodiments.

FIG. 4 depicts an illustrative method for transmission of notifications, and reception of responses, corresponding to an emergency event, in accordance with one or more example embodiments. Referring to FIG. 4, at step 405, a computing platform comprising at least one processor, a communication interface, and memory may receive, via the communication interface, emergency event information via the communication interface. The emergency event information may comprise a first location information corresponding to an emergency event. At step 410, the computing platform may identify, based on the emergency event information, a first target device. At step 415, the computing platform may transmit, via the communication interface to the first target device, a first notification, wherein the first notification comprises the first location information. At step 420, the computing platform may receive, via the communication interface and from the first target device, a response corresponding to the first notification. At step 425, the computing device may identify, based on the response and the emergency event information, second target device. At step 430, the computing device may transmit, via the communication interface and to the second target device, a second notification, wherein the second notification comprises a second location information, wherein the second location information is different from the first location information. In various embodiments, the computing platform may correspond to the notification decision platform 105 described above with reference to FIGS. 1A, 1B, 2A, and 2B, or any other device that performs functions corresponding to FIG. 4.

Figure 5:
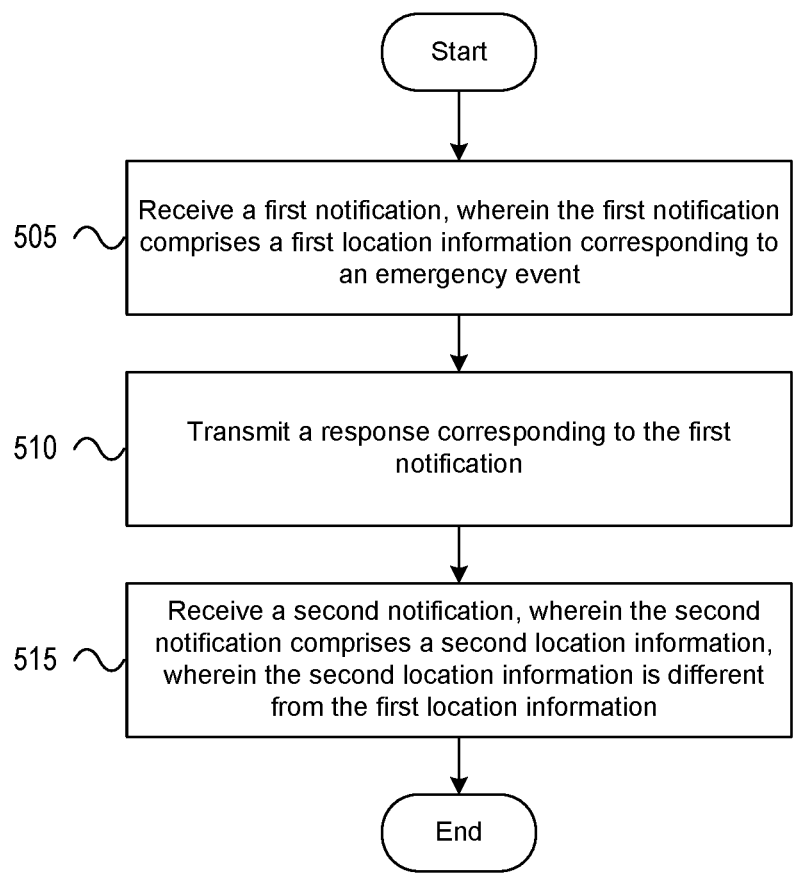
FIG. 5 depicts an illustrative method for reception of a notification, corresponding to an emergency event, and transmission of a response to the notification, in accordance with one or more example embodiments.

FIG. 5 depicts an illustrative method for reception of a notification, corresponding to an emergency event, and transmission of a response to the notification, in accordance with one or more example embodiments. Referring to FIG. 5, at step 505, a communication device comprising a processor, a communication interface, and memory, may receive, via the communication interface and from a computing platform, a first notification. The first notification may comprise a first location information corresponding to an emergency event. At step 510, the communication device transmits, via the communication interface to the computing platform, a response corresponding to the first notification. At step 515, the communication device may receive, via the communication interface from the computing platform, a second notification. The second notification may comprise a second location information, wherein the second location information is different from the first location information. In various embodiments, the communication device may correspond to the external computer system 135, or the external notification device 145, or the external notification device 150, described above with reference to FIGS. 1A, 1B, 2A, and 2B, or any other device that performs functions corresponding to FIG. 5.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
receive, via the communication interface, emergency event information, wherein the emergency event information comprises a first location information corresponding to an emergency event;
identify, based on the emergency event information, a first target device;
transmit, via the communication interface to the first target device, a first notification, wherein the first notification comprises the first location information;
receive, via the communication interface and from the first target device, a response corresponding to the first notification;
identify, based on the response and the emergency event information, a second target device; and
transmit, via the communication interface and to the second target device, a second notification, wherein the second notification comprises a second location information, wherein the second location information is different from the first location information.

2. The computing platform of claim 1, wherein identifying the first target device comprises identifying a device as the first target device based on one or more of (i) location of the device, (ii) location of the emergency event, (iii) preferences of a user corresponding to the device, (iv) location of the user, (v) emergency event type, and/or (vi) severity of the emergency event.

3. The computing platform of claim 1, wherein identifying the second target device comprises identifying a device as the second target device based on one or more of (i) location of the device, (ii) location of the emergency event, (iii) preferences of a user corresponding to the device, (iv) location of the user, (v) emergency event type, and/or (vi) severity of the emergency event.

4. The computing platform of claim 1, wherein the second target device is same as the first target device.

5. The computing platform of claim 4, wherein the second location information corresponds to a location of a communication device different from the first target device.

6. The computing platform of claim 1, wherein the second target device is different from the first target device.

7. The computing platform of claim 6, wherein the second location information corresponds to a location of the first target device.

8. The computing platform of claim 1, wherein the memory stores additional computer-readable instructions, that when executed by the at least one processor, cause the computing platform to:
receive, via the communication interface, updated emergency event information, wherein the updated emergency event information comprises updated information corresponding to the emergency event;
identify, based on the updated emergency event information, a third target device; and
transmit, via the communication interface to the third target device, a third notification.

9. A method, comprising:
at a computing platform comprising at least one processor, a communication interface, and memory:
receiving, via the communication interface, emergency event information, wherein the emergency event information comprises a first location information corresponding to an emergency event;
identifying, based on the emergency event information, a first target device;
transmitting, via the communication interface to the first target device, a first notification, wherein the first notification comprises the first location information;
receiving, via the communication interface and from the first target device, a response corresponding to the first notification;
identifying, based on the response and the emergency event information, a second target device; and
transmitting, via the communication interface to the second target device, a second notification, wherein the second notification comprises a second location information, wherein the second location information is different from the first location information.

10. The method of claim 9, wherein the second target device is same as the first target device.

11. The method of claim 10, wherein the second location information corresponds to a location of a communication device different from the first target device.

12. The method of claim 9, wherein the second target device is different from the first target device.

13. The method of claim 12, wherein the second location information corresponds to a location of the first target device.

14. The method of claim 9, further comprising:
receiving, via the communication interface, updated emergency event information, wherein the updated emergency event information comprises updated information corresponding to the emergency event;
identifying, based on the updated emergency event information, a third target device; and
transmitting, via the communication interface to the third target device, a third notification.

15. A communication device, comprising:
at least one processor;
a communication interface communicatively coupled to the at least one processor; and
memory storing computer-readable instructions that, when executed by the at least one processor, cause the communication device to:
receive, via the communication interface and from a computing platform, a first notification, wherein the first notification comprises a first location information corresponding to an emergency event;
transmit, via the communication interface and to the computing platform, a response corresponding to the first notification; and
receive, via the communication interface and from the computing platform, a second notification, wherein the second notification comprises a second location information, wherein the second location information is different from the first location information.

16. The communication device of claim 15, wherein the second location information corresponds to a location of another communication device different from the computing platform.

17. The communication device of claim 15, wherein the memory stores computer-readable instructions, that when executed by the at least one processor, further cause the communication device to:

transmit, via the communication interface and to another communication device different from the computing platform, at least a portion of information in at least one of the first notification and the second notification.

18. The communication device of claim 15, wherein the response corresponding to the first notification is based on a user input at the communication device.

19. The communication device of claim 18, wherein the second location information is based on the user input at the communication device.

20. The communication device of claim 15, wherein the memory stores computer-readable instructions, that when executed by the at least one processor, further cause the communication device to:
  receive, via the communication interface and from the computing platform, a third notification, wherein the third notification comprises an update to the emergency event.

\* \* \* \* \*